United States Patent [19]
Yamada

[11] Patent Number: 5,436,879
[45] Date of Patent: Jul. 25, 1995

[54] RECORDING AND REPRODUCING METHODS OF WRITE-ONCE READ-MANY TYPE RECORDING MEDIUM

[75] Inventor: Naoki Yamada, Tokyo, Japan

[73] Assignee: Olympus Optical Co., Ltd., Tokyo, Japan

[21] Appl. No.: 111,170

[22] Filed: Aug. 24, 1993

[30] Foreign Application Priority Data

Sep. 2, 1992 [JP] Japan .................................. 4-234736

[51] Int. Cl.$^6$ ............................................... G11B 7/00
[52] U.S. Cl. .......................................... 369/47; 369/32; 369/58; 235/454
[58] Field of Search .................. 235/454, 494; 369/47, 369/48, 54, 58, 32, 50

[56] References Cited

U.S. PATENT DOCUMENTS

| | | | |
|---|---|---|---|
| 4,868,806 | 9/1989 | Sakagami | 235/454 |
| 4,979,159 | 12/1990 | Tsuruoka et al. | 235/454 |
| 4,982,074 | 1/1991 | Ogasawara | 235/454 |
| 5,204,514 | 4/1993 | Horiguchi | 235/454 |
| 5,288,982 | 2/1994 | Hosoya | 235/454 |

FOREIGN PATENT DOCUMENTS 61-279957 12/1986 Japan .
2199684 7/1988 United Kingdom ................ 235/454

Primary Examiner—Georgia Y. Epps
Assistant Examiner—P. W. Huber
Attorney, Agent, or Firm—Frishauf, Holtz, Goodman & Woodward

[57] ABSTRACT

A method of recording data includes irradiating a light spot on an optical card having a recording area including a user data region and an index data region arranged adjacent to each other. User data is recorded on the user data is recorded region and index data on the index data region. User data relates to the user of an optical card and may be stored in accordance with the usage of the card, such as name and age of the user. Index data is necessary for retrieving a desired user data. An optical spot is moved from a track to another track to a plus side in the user data region during the recording, whereas in the index data region, the optical spot is moved from track to track to the minus side.

17 Claims, 7 Drawing Sheets

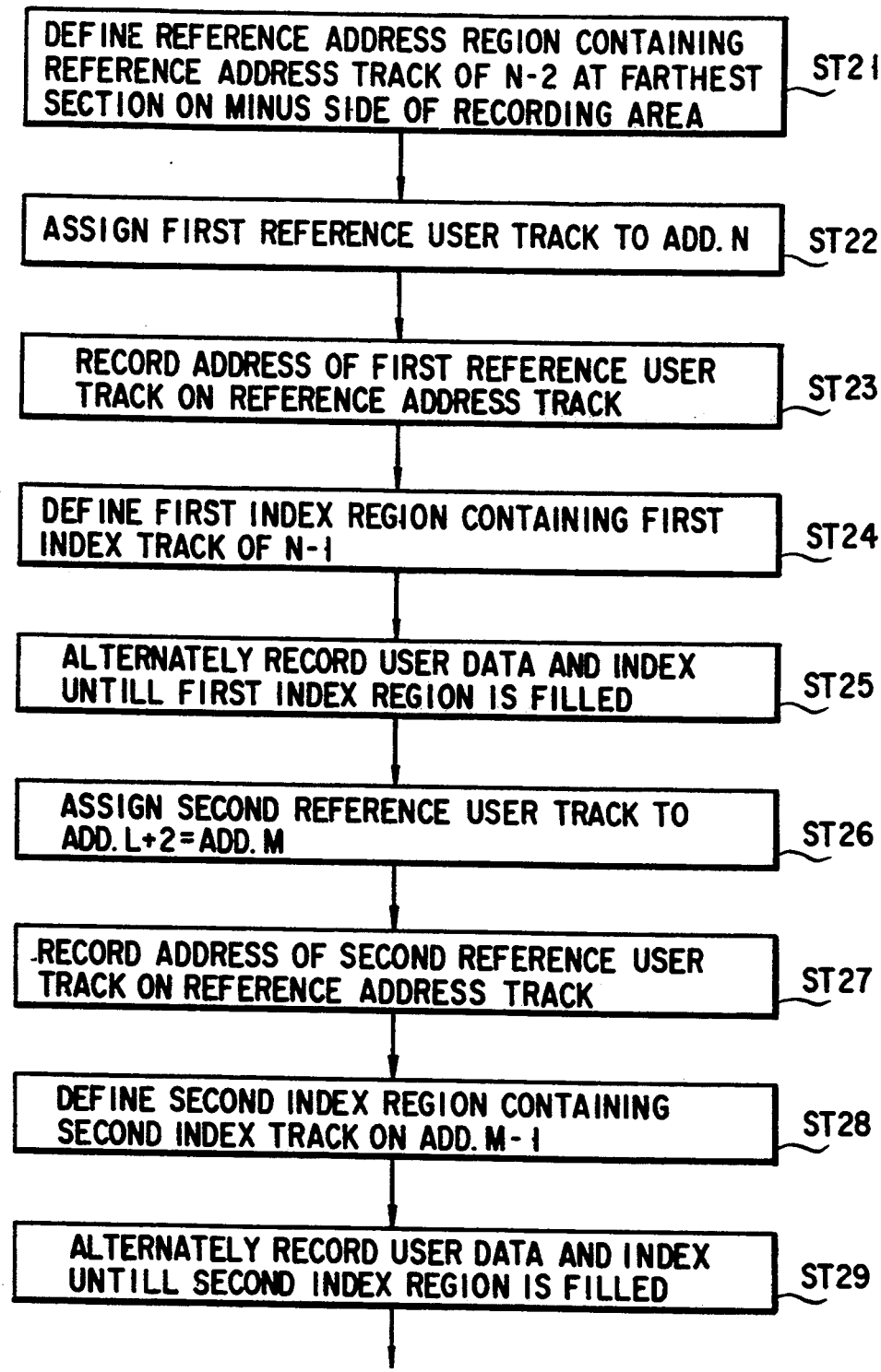
F I G. 5

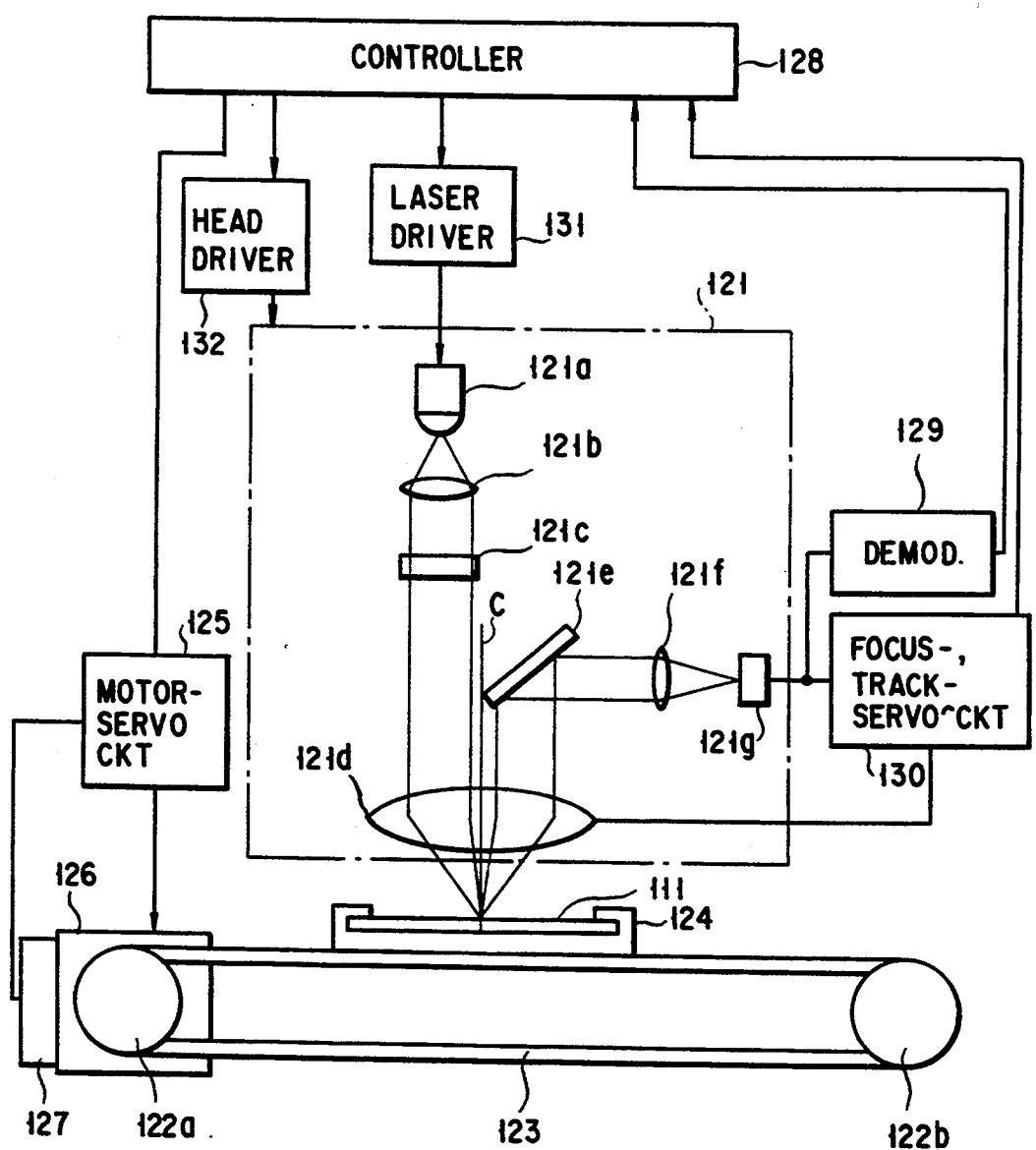
F I G. 7

RECORDING AND REPRODUCING METHODS OF WRITE-ONCE READ-MANY TYPE RECORDING MEDIUM

BACKGROUND OF THE INVENTION

1. Field of the Invention

The present invention relates to data recording and reproducing methods for a write-once read-many type (WORM) recording medium, especially, of a type comprising a recording area including a user data region for storing user data and an index data region for storing index data. The user data includes user data items and the index data comprises index data items.

2. Description of the Related Art

The term "user data" is defined as a type of data relating to the user of the WORM type recording medium, for example, name and age of the user, which may be stored in accordance with the usage of the medium. The term "index data" is defined as a type of data necessary for retrieving a desired user data item such as file name of a user data item, address of the first track on which the user data item is recorded, or the like.

Data recording and reproducing methods of the above-described type is disclosed in Jpn. Pat. Appln. KOKAI Publication No. 61-279957. Now, the methods of the publication will be described with reference to FIG. 1. Since the recording method is similar to the reproduction, only the recording method will be explained for the sake of simplification.

FIG. 1 depicts a rectangular optical card 50 (to be simply called "card" hereinafter), i.e., a write-once read-many type recording medium. On the upper surface of the card 50, a number of tracks 52 arranged in parallel with each other are formed along the longitudinal direction of the card 50. The tracks 52 are located within a data recording area 54.

Data is recorded on each of the tracks 52 in the following manner. A light spot 55 is irradiated on a part of one of the tracks 52 by means of an optical head (not shown) serving as a recording head, and the light spot is moved along the same track 52.

The user data and index data are alternately recorded. More specifically, a user data item is first recorded, and then an index data item corresponding thereto is recorded. After that, another user data item is recorded, and then an index data item corresponding thereto is recorded. The recording performed in the above-described manner will be called hereinafter "alternate recording".

The recording of the user data starts from a track 52a located at the farthest position on the minus (−) side of the recording region 54, whereas the recording of the index data starts from a track 52c located at the farthest position on the plus (+) side of the recording region 54.

As the user data is recorded in the alternate recording proceeds, the recording of the user data is carried out in the following manner. For example, when the recording on the track 52a is completed, the recording moves on to the track 52b adjacent to the track 52a in the plus (+) direction. In the same manner, the recording of the user data proceeds from the track 52a located at the farthest position on the minus (−) side consecutively to tracks located in the plus (+) direction, thus forming a user data region 56 in the recording area 54 from the minus (−) to plus (+) side.

As the alternate recording progresses, the index data is recorded in a similar fashion to the above. For example, when the recording on the track 52c is completed, the recording moves on to the track 52d adjacent to the track 52c in the minus (−) direction. In the same manner, the recording off the index proceeds from the track 52c located at the farthest position on the plus (+) side consecutively to tracks located in the minus (−) direction, thus forming an index data region 58 in the recording area 54 from the plus (+) to minus (−) side.

In the above-described conventional method, the recordings of the user data and the index data start from the tracks 52a and 52c, respectively, each located at one end of the card 50. In general, each user data item and an index data item corresponding thereto are alternately recorded. As a result, when the recording is carried out by the conventional method, the light spot 55 inevitably must travel a large distance in the direction perpendicular to the tracks 52, increasing the time required for recording. The reproduction of data recorded on a medium by the conventional method involves a procedure similar to the aforementioned recording, so it takes much time to reproduce the data.

It is also possible that a given number of user data items are first recorded, and a number of index data items corresponding thereto are then recorded, without conducting the alternate recording of user data and index data. However, this is also the case that the travel distance of the light spot 55 along the direction perpendicular to the tracks 52 is long.

SUMMARY OF THE INVENTION

The present invention has been proposed in consideration of the drawback entailed in the conventional technique, and the purpose thereof is to provide a recording and reproducing method for a write-once read-many (WORM) type recording medium, which can shorten the recording and reproduction time period by decreasing the travel distance of the light spot in the direction perpendicular to the tracks.

According to the present invention, there is provided a method of recording data by irradiating a light spot on a write-once read-many type recording medium, the recording medium comprising a recording area including a user data region and an index data region arranged adjacent to each other, the user data region having at least one track for recording user data including at least one user data item used by a user of the recording medium, the index data region having at least one track for recording index including at least one index data item data used for search of desired user data in the user data region, the track in the index region arranged substantially in parallel with the track An the user data region, the index data region arranged on a first direction side with respect to the user data region, the method comprising the step of assigning a reference user track to a track located at a farthest position on the first direction side in the user data region, the step of assigning a reference index track to a track located at a farthest position on a second direction side in the index data region, the second direction side is opposite to the first direction side, and the step of writing data on a track, including the substeps of starting the recording of user data from the reference user track in the user data region, starting the recording of index data corresponding to the user data to be recorded, from said reference index track in the index data region, moving the recording of user data in the user data region from a track, the recording of which has been completed, onto a track adjacent to the completed track on the second direction side, and moving the recording of index data in the index data region from a track, the recording of which has been completed, onto a track adjacent to the completed track on the first direction side.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5 is a flowchart illustrating the process of the second embodiment;

FIG. 7 is a block diagram of an apparatus recording and reproducing data on/from a recording medium according to the methods of the present invention.

DETAILED DESCRIPTION OF THE PREFERRED EMBODIMENTS

Embodiments of the present invention will now be described with reference to accompanying drawings.

The first embodiment of the present invention, i.e. the recording and reproducing methods for a write-once read-many (WORM) data recording medium, will be described in detail. The reproduction method undergoes substantially the same steps steps as that of the recording method. Therefore, only the recording mode will be described for a simplification. Note that the second embodiment will be described in a similar fashion to the first embodiment. In addition, the characterizing feature of the invention does not reside in the alternate recording itself, and the description of the embodiments would be too lengthy and complicated if it includes the operation of the alternate recording. Therefore, the description of the embodiments will be provided on the assumption that the recording of data is alternately carried out (without giving the description of the alternate recording). More specifically, the recording of a number of user data items will be first described, and then the recording of index data items, each corresponding to each of the user data items, will be explained.

Figure 1:
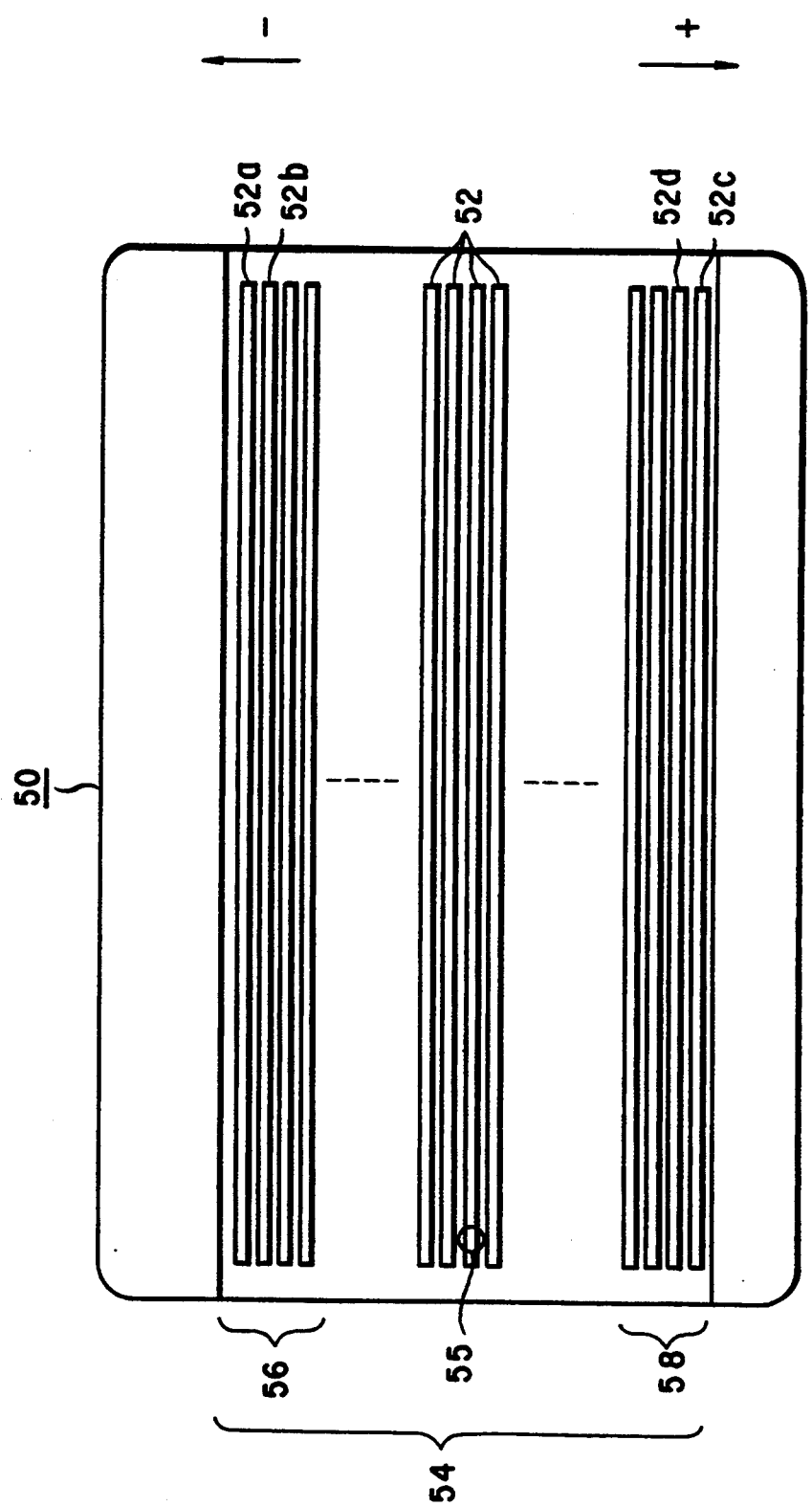
FIG. 1 is a top view of an optical card used in the conventional data recording and reproducing methods.
Figure 2:
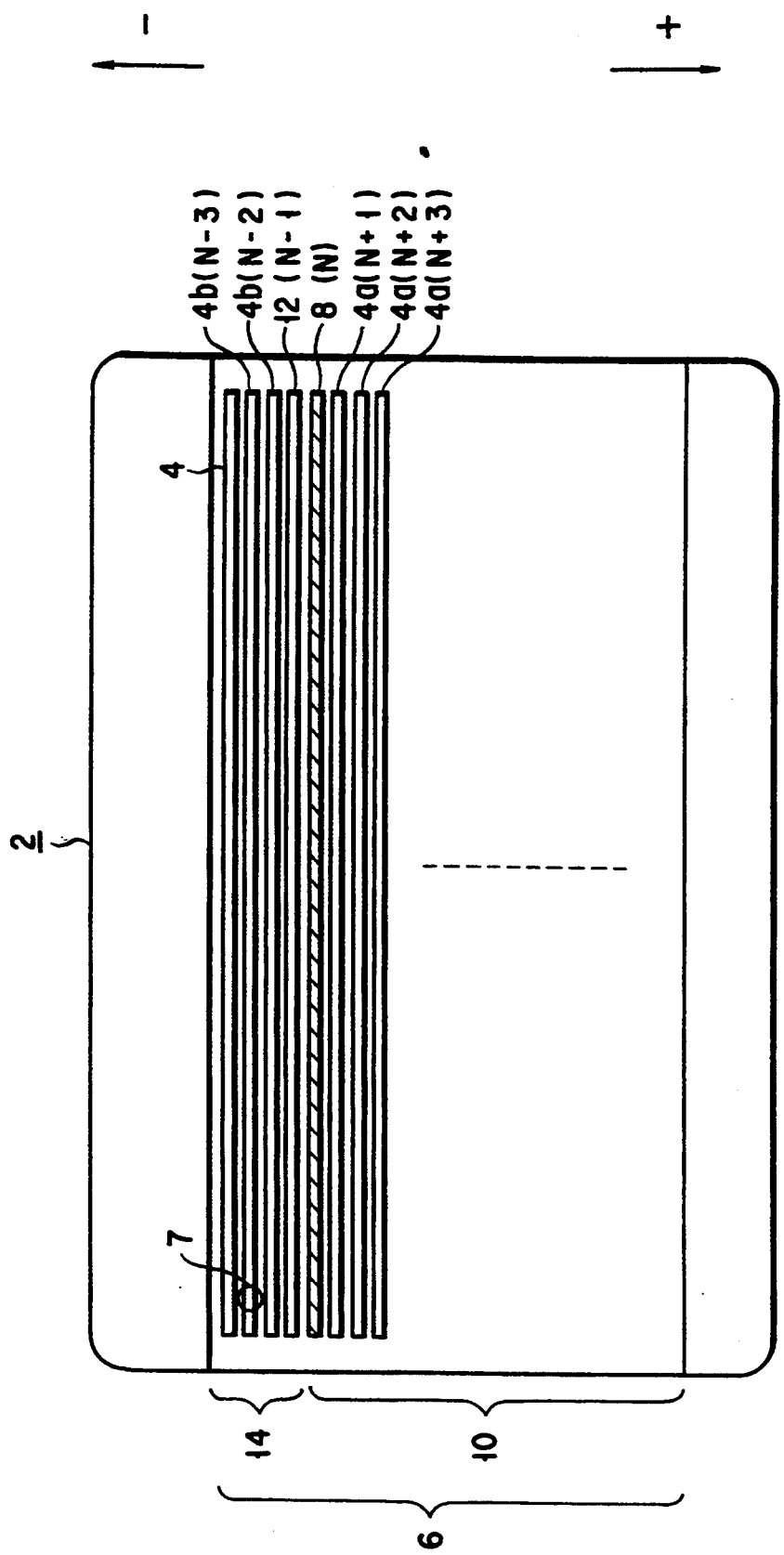
FIG. 2 is a top view of an optical card used in the recording method according to the first embodiment of the data recording and reproducing methods for a WORM type recording medium of the present invention.

FIG. 2 depicts a rectangular optical card 2 (to be called simply "card" hereinafter/, i.e., a write-once read-many type recording medium. On the upper surface of the card 2, formed are a number of tracks 4 arranged in parallel with each other along the longitudinal direction of the card 2. A data recording area 6 is defined by these tracks 4.

Figure 3:
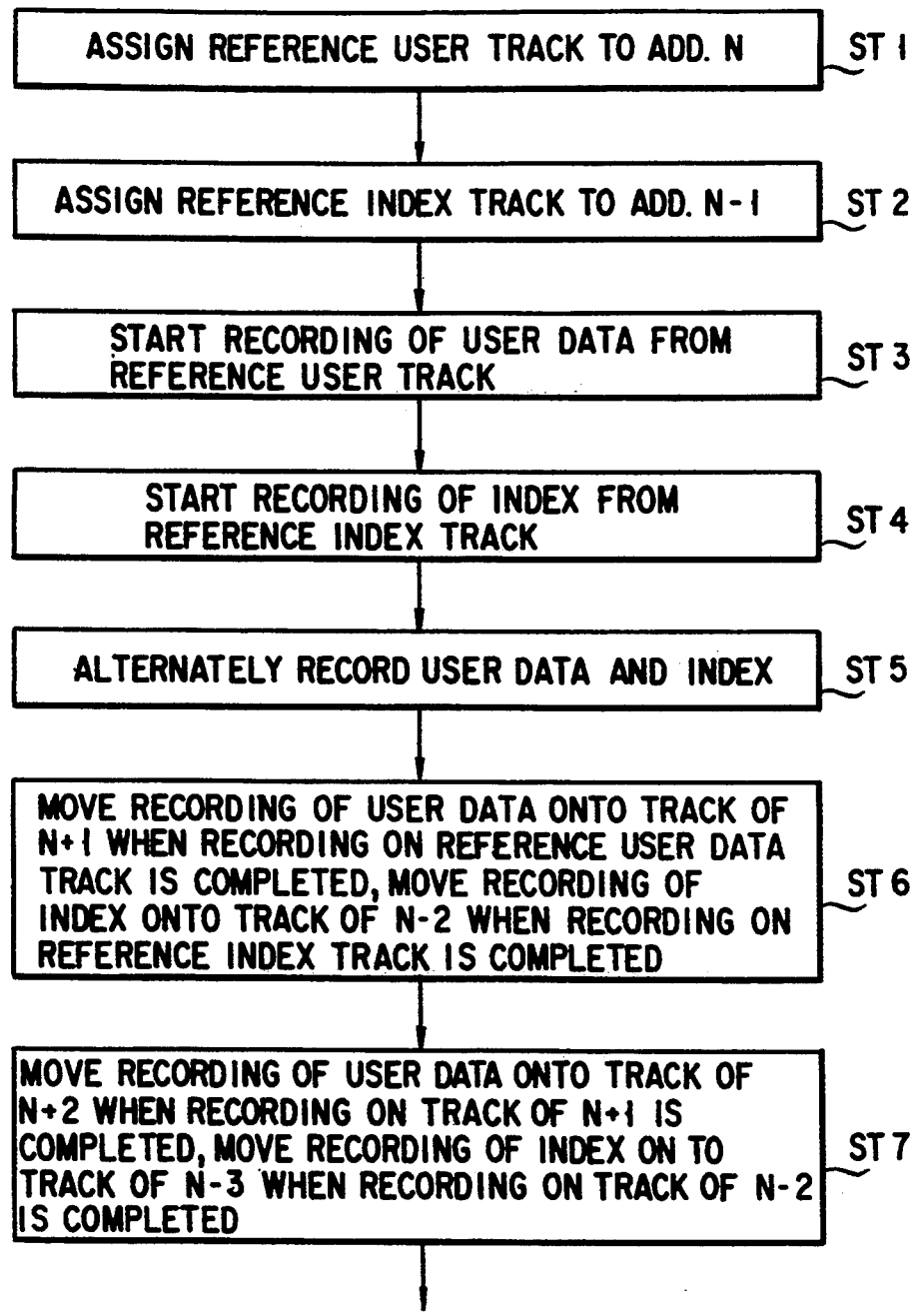
FIG. 3 is a flowchart illustrating the process of the first embodiment.

FIG. 3 is a flowchart illustrating the process of the first embodiment.

Data is recorded on each of the tracks 4 in the following manner. A light spot 7 is irradiated on a part of one of the tracks 4 by means of an optical head (not shown) serving as recording head, and the light spot is moved along that one of the tracks 4.

An arbitrary one of the tracks within the data recording area 6 is used as a reference user track 8, and it is supposed that the address of the reference user track 8 is N (ST1). Then, the track adjacent to the reference user track 8 on the minus (−) side, i.e. that one of the tracks 12 at address of N−1, is used as a reference index track (ST2).

The recording of the user data starts from the reference user track 8 (ST3). More specifically, the user data item to be first recorded is recorded on the reference user track 8. In contrast, the recording of the index data starts from the reference index track 12 (ST4). More specifically, the index item to be first recorded is recorded on the reference index track 12. In the manner as above, each user data item and each index data item corresponding thereto are alternately recorded (ST5).

As the alternate recording proceeds, the recording of the user data is carried out in the following manner. When the recording on the reference user track 8 is completed, the recording moves on to that one of tracks 4a which is located adjacent to the track 8 on the plus (+) side, i.e. track 4a at address of N+1 (ST6). Further, when the recording on the track 4a at an address of N+1 is completed, the recording moves on to that one of tracks 4a which is located adjacent thereto further on the plus (+) side, i.e. track 4a at address of N+2 (ST7). As the recording continues as above, a user data region 10 is formed of tracks 4a located on the plus (+) side of the reference address track 8.

As the alternate recording proceeds, the recording of the index is carried out in the following manner. When the recording on the reference index track 12 is completed, the recording moves on to that one of tracks 4b which is located adjacent to the track 12 on the minus (−) side, i.e. track 4b at address of N−2 (ST6). Further, when the recording on the track 4b at an address of N−2 is completed, the recording moves on to that one of tracks 4b which is located adjacent thereto further on the minus (−) side, i.e. track 4b at address of N−3 (ST7). As the recording continues as above, an index region 14 is formed of tracks 4b located on the minus (−) side of the reference index track 12.

For recording other user data than those already recorded, on the card 2, there are two applicable recording methods. According to one of them, the user data already recorded is read out from the user data region 10, and the additional recording is performed from the point where the non-recorded region appears. According to the other one, the index region 14 is read out to search the non-recorded region of the user data region 10, and the additional data is recorded in the non-recorded region if the non-recorded region is large enough to hold the additional user data.

In the case where data is recorded as described in this reference, the travel distance of the optical head along the direction perpendicular to the tracks of the card is decreased, thus shortening the recording time period.

This is also the case with the reproduction method, and the same advantage can be obtained.

A typical example of the card shown in FIG. 2 is a health care card in which the results of, for example, annual medical checkups are recorded. The size of the data does not change from year to year, the data recording region 6 of the card 2 can be fully used.

when there is a large amount of data recorded on the card, data items (user data items and index data items) which are frequently accessed are recorded near the reference user track 8 and the reference index track 12 (to be called the "reference tracks 8 and 12"), whereas data items which are infrequently accessed are recorded on tracks located away from the reference tracks 8 and 12. For example, of the data items recorded on a card, ID data items such as name, age, and address of the owner of the card, which are always read out if exist, are recorded on tracks located near the reference tracks 8 and 12, whereas other data items which are infrequently accessed are recorded on tracks located away from the reference tracks 8 and 12. Thus, the reproduction time period can be shortened.

Nowadays, there has been proposed a multi-track read/write method, in which a number of tracks are recorded or reproduced at the same time. By combining this method with the recording and reproducing methods of the present invention, the time period required for recording or reproducing can be shortened.

For example, in the case where the multi-track read/write method, in which 8 tracks are recorded or reproduced at the same time, and the present embodiment method are combined together, 8 tracks (total of 8 tracks from the index track at an address of N−1 to the user data track at an address of N+6) located on the minus (−) and plus (+) sides of the reference user track 8 are recorded or reproduced by 1 running of scan. Further, by combining these method with the above-mentioned method in which recording data items frequently accessed are recorded near the reference tracks 8 and 12, the time required for recording or reproduction is shortened. For example, according to the conventional technique as well as this embodiment, the alternate recording is conducted. More specifically, the user data is first recorded and then the index data is recorded in the case of recording, whereas the target user data track is first searched by reproducing the index data, and then the user data track is reproduced in the case of reproduction. However, in the case where these three methods ace combined together as above-described, it is no longer necessary to carrying out the recording or reproduction in several steps as in the conventional technique or in the first embodiment.

Figure 4:
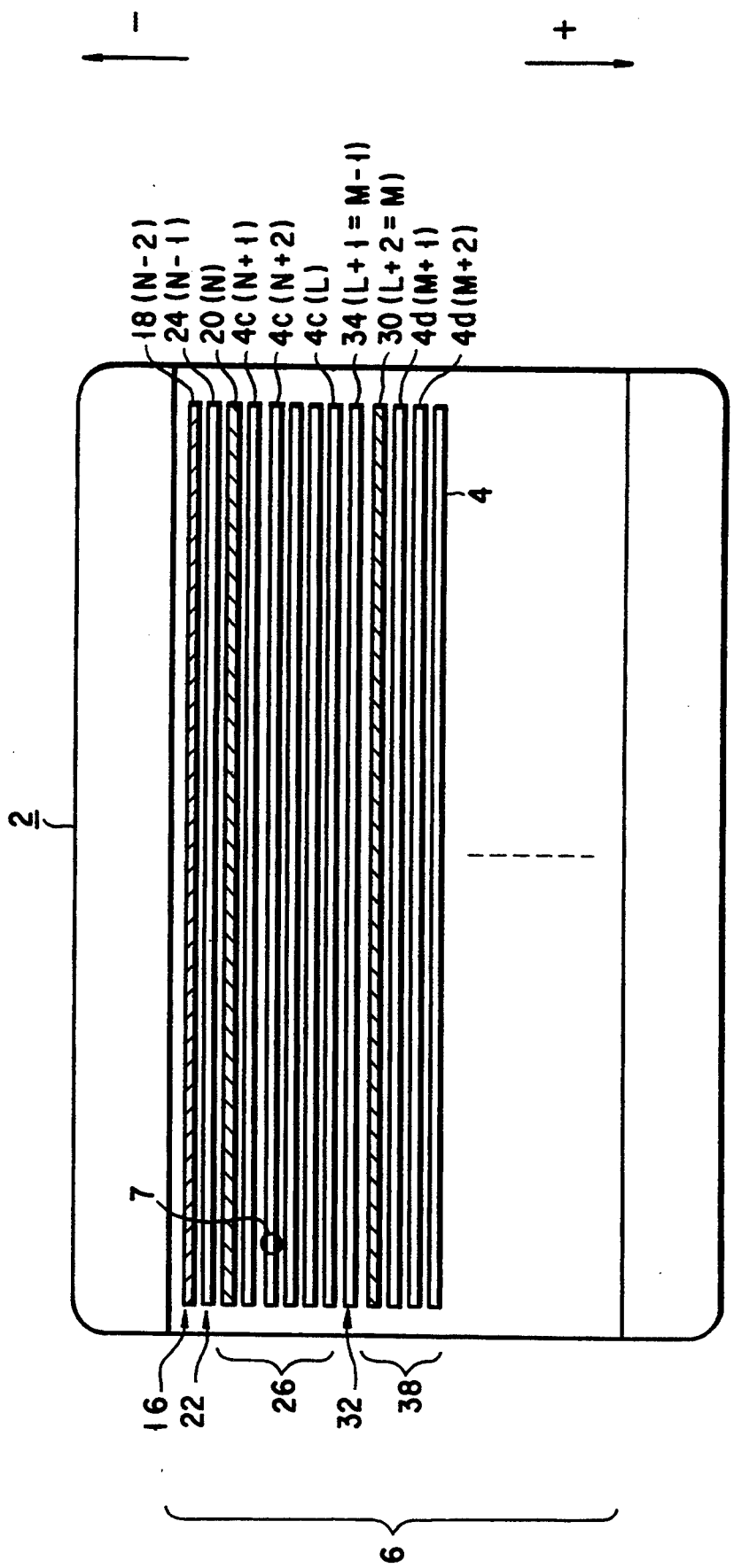
FIG. 4 is a top view of an optical card used in the second embodiment.

Next, the recording method according to the second embodiment of the present invention will now be described with reference to FIG. 4. Some of the structural elements of the card and the recording operation in the second embodiment are the same as those employed in the first embodiments, and the description of such elements will be omitted.

According to the method of this embodiment, two or more reference user tracks, reference index tracks, user data regions, and index regions are formed.

FIG. 5 is a flowchart illustrating the process of the second embodiment. First, a reference address region 16 is assigned to the farthest position on the minus (−) side within the data recording region 6 of the card 2 (ST21). In the reference address region 16, data items including addresses of two or more reference user tracks, which will be described later, are recorded. In this embodiment, there is provided one reference address track 18 in the reference address region 16.

Next, the first reference user track 20 is assigned to the track at an address of N ST22). The value N of this address is set such that the track at an address of N−2 functions as the reference address track 18. The address N of the first reference track 20 is recorded on the reference address track 18 in the reference address region 16 (ST23).

The first index region 22 is assigned to the location of address N−1 (ST24). In this embodiment, one first (reference) index track 24 is provided within the first index region 22.

Not only in the first index region 22, but also in each of the other index regions, provided is only one index track. In general, the index data is limited to the items necessary for searching the user data, such as file name of user data, and address of the user data track on which the user data is recorded, and therefore the index is regardless of the size of the user data itself indicated by that index. If the dividing one index track into short sectors, the same number of files as that of the divided sectors of index items can be recorded. Thus, one track can hold an index which is divided into a predetermined number of files. In this embodiment, one index track is divided into 16 sectors.

Until there is no longer an empty room in the first index region 22 (the first (reference) index track 24), user data items and index items awe alternately recorded (ST25).

As the alternate recording proceeds, the recording of the user data is carried out in the following manner. When the recording on the first reference user track 20 is completed, the recording moves on to that one of tracks 4c which is located adjacent to the track 20 on the plus (+) side, i.e. track 4c at address of N+1. Further, when the recording on the track 4c at an address of N+1 is completed, the recording moves on to that one of tracks 4c which is located adjacent thereto further on the plus (+) side, i.e. track 4c at address of N+2. As the recording continues as above, a first user data region 26 is formed.

when the formation of the first user data region 26 is completed, the second reference user track 30 is set in the following manner.

First, of the tracks 4c of the first user data region 26, to the one located at the farthest position on the plus (+) side, an address of L is given. Then, the track 4c at an address of L+2 is used as the second reference user track 30 (address M) (ST26).

Next, the address M of the second reference user track 30 is recorded on the reference address track 18 (ST27). Then, second index region 32 (second (reference) index track 34) is assigned to the track at an address of L+1 (=address M−1 (ST28). Until there is no longer an empty room in the second index region 32, user data items and index items are alternately recorded (ST29).

As the alternate recording proceeds, the recording of the user data is carried out in the following manner. When the recording on the second reference user track 30 is completed, the recording moves on to that one of tracks 4d which is located adjacent to the track 30 on the plus (+) side, i.e. track 4d at address of M+1. Further, when the recording on the track 4d at an address of M+1 is completed, the recording moves on to that one of tracks 4d which is located adjacent thereto further on the plus (+) side, i.e. track 4d at address of M+2. As the operation continues as above, a second user data region 38 is formed.

Further, the above operation is repeated, and until there is no longer an empty room in the data recording area 6 of the card 2, the third, fourth, fifth, and so on reference user tracks are formed, and the user data regions and the index regions with reference to these reference user tracks are formed.

The other recording operation is the same as that of the first embodiment.

When the recording of data is carried out as in this embodiment, and the data is reproduced as in a similar manner to the recording method, the data recording area 6 is effectively used while shortening the recording and reproducing time period. Thus, while maintaining the advantage of the first embodiment, the data recording area can be effectively used. Naturally, as is the case with the first embodiment, the advantage of the invention will be more prominent when the recording and reproducing method is combined with the multi-track read/write mode.

This embodiment is directed to the case where only the address of each reference user track is recorded in the reference address region 16. By recording data such as time and date of creation of reference user track, or key word used for search, it is possible to access to only the reference user track necessary for reproducing the data on the basis of the above-mentioned recorded data. Thus, the reproduction time can be shortened.

In the above two embodiments, the expression "the recording on a (predetermined) track is completed" was used. Such recording on a track can be conducted in various ways.

For example, in the case where the amount or size of one data item (user data item or index data item) is equal to the capacity of one track, the recording on one track is completed with one data item.

In the case where the size of one data item is larger than the capacity of one track, the data items cannot be fit into the track. In this case, the excessive portion is recorded on a track adjacent to that track.

In the case where the size of one data item is smaller than the capacity of one track, the non-recorded region of the track may be left non-recorded, thus completing the recording on that track, or some other data item/items may be recorded in the non-recorded region of the track.

In any of the above cases, the alternate recording employed in the two embodiments is not changed. In other words, after the recording of a user data item is completed, an index item corresponding thereto is recorded in any above cases.

As mentioned in the beginning, only the recording mode was explained in the two embodiments, since the reproduction of the data recorded by the recording mode proceeds in substantially the same steps as those of the recording mode.

Next, an example of an apparatus recording and reproducing data on/from a recording medium according to the methods of the present invention, will now be described.

Figure 6:
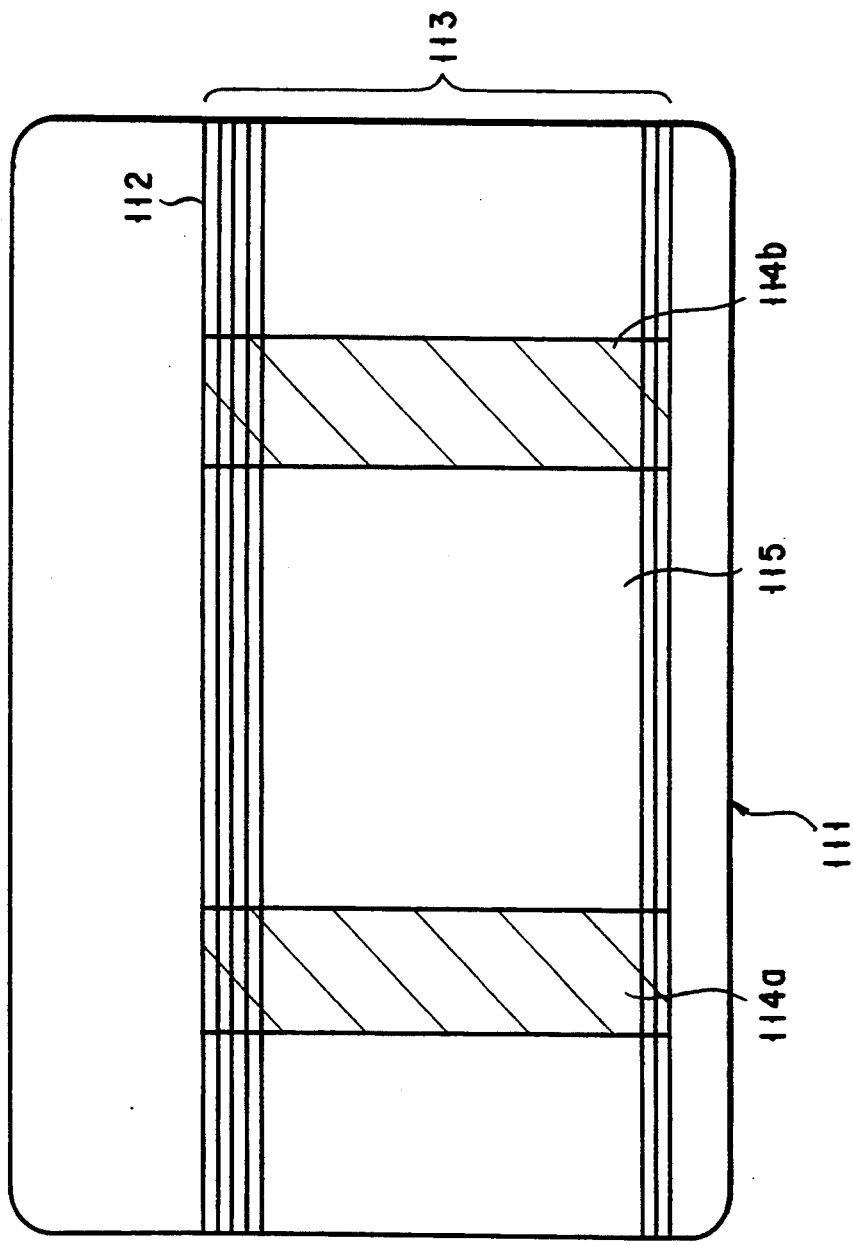
FIG. 6 is plan view illustrating an optical card for use in the apparatus shown in FIG. 7.

FIG. 6 is a plan view illustrating an optical card for use in the above apparatus. An optical card 11 has its one surface provided with an optical data recording section 113, which is divided into a plurality of parallel tracks 112 in the lengthwise direction of the card. Movement of the optical card 111 with respect to a fixed optical head or movement of a movable optical head with respect to the optical card 111 when it is of a fixed type causes tracks 112 to be scanned with a laser beam for data recording and reproducing.

Each track 112 has its center portion serving as a data section 115, and two identifier (ID) sections 114a and 114b, on which the address of the track is recorded, are provided adjacent to both ends of the data section 115, respectively. These ID sections 114a and 114b permit address readout in both lateral movements of the card 111 with respect to the optical head. In order to prevent an error in data readout due to a scratch, stain or the like at the edge portions of the optical card 111 and to sufficiently stabilize the moving speed of the card 111 with respect to the optical head, ID sections 114a and 114b are located at a given distance from the cards edge portions.

FIG. 7 is a block diagram of an apparatus for recording/reproducing data using the optical card 111. According to this apparatus, a fixed optical head 121 scans a track with a laser beam while moving optical card 111 in the track direction so as to access data section 115 for data recording/reproducing. When the recording/reproducing of one track is completed, the optical head 121 moves in the direction perpendicular to the tracks to be ready for recording/reproducing of the next track.

A shuttle 124 is provided at a predetermined location on an endless conveyor belt 123 stretched over pulleys 122a and 122b. The optical card 111 is loaded in shuttle 124 with the card's lengthwise direction coinciding with the moving direction of the shuttle 124.

Accordingly, when the conveyer belt 123 is driven, the optical card 111 is moved in its lengthwise direction. The belt 123 is driven by a motor 126 coupled to pulley 122a. When the shuttle 124 is conveyed by a distance corresponding to the length of the card, the motor 126 is rotated in the reverse direction.

The motor 126 is provided with a rotary encoder 127 for detecting the amount and direction of its rotation, and the detection signal from this rotary encoder 127 is fed back to a motor-servo circuit 125.

The controller 128 sends a control instruction signal to the motor-servo circuit 125 so as to make constant the transfer speed of the optical card 111 between the ID sections 114a and 114b in accordance with the position data of the shuttle 124 from the rotary encoder 127.

The optical mechanism of the optical head 21 employs the "axial dislocation method". The optical beam irradiated from the laser diode 121a is made into a parallel beam by means of a collimator lens 121b, and then divided into 3 beams through a diffraction grating 121c. The divided beams are made incident on the objective lens 121d at positions dislocated from the central axis C, and projected on the optical card 111. The reflection beams from the optical card 111 again pass through the objective lens 121d, and the direction of the beams is changed at an angle of 90° by a mirror 121e. Then, the reflection light beams are focused on the optical detector 121g by means of a focus lens 121f.

The output of the detector 121 is supplied through a demodulator 129 to the controller 128 as reproduction data.

The output of the detector 121g is also supplied to focus/track-servo circuit 130, which drives objective lens 121d in accordance with a command from the controller 128 to control the focusing and tracking of objective lens 121d so that a larger beam is irradiated on the optical card 111 always in a focused state.

The controller 128 controls laser diode 121a through a laser driver 131 to emit a laser beam whose intensity is modulated according to the level, "0" or "1" of recording data at the time data recording and emit a laser beam with a constant level (normally, "0" level in the data recording) at the time of data reproducing. The controller 128 also controls motor-servo circuit 125, demodulator 129 and focus/track-servo circuit 130 to seek a desired track based on the track address data demodulated by the demodulator 129.

With the device having the above-described structure, the method of the present invention can be fully practiced.

The present invention is not limited to the above two embodiments, but may be remodeled into various versions. For example, in the embodiments, a number of tracks are arranged in the longitudinal direction of the card. However, the invention is also applicable for a card on which the tracks are arranged in the width direction thereof. Or, an optical card is employed as a write-once read-many data recording medium in the embodiments, but the data recording medium may be of a magnetic type. Further, the shape of the medium does not have to be rectangular card, but may be disk or the like.

In the embodiments, the alternate recording method similar to that of the conventional technique was employed, but it is also possible to employ the following method. That is, it is also possible that as a number of data items (user data items and index data items) are being recorded, each index item is stored and maintained in the program device, and after a certain number of user data items have been written, the index items corresponding thereto are copied on the medium at once.

According to the present invention, the travel distance of the light spot in the direction perpendicular to the tracks can be decreased, and therefore there is provided a recording and reproducing method for a write-once read-many data recording medium, which can be shorten the recording and reproducing time period.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A method of recording data by irradiating a light spot on a write-once read-many type recording medium, said recording medium comprising a recording area including a user data region and an index data region arranged adjacent to each other, said user data region having at least one track for recording user data including at least one user data item used by a user of said recording medium, said index data region having at least one track for recording index data including at least one index data item used for search of desired user data in the user data region, said at least one track in the index data region being arranged substantially in parallel with the at least one track in the user data region, said index data region being arranged adjacent to said user data region on a first direction side of said user data region, and said user data region being on a second direction side of said index data region which is opposite to said first direction side, said method comprising:

(1) a step of assigning a reference user track to a track located at a farthest position on the first direction side in the user data region;
(2) a step of assigning a reference index track to a track located at a farthest position on the second direction side in the index data region; and
(3) a step of writing data on a track, said step of writing data on a track including the substeps of:
 (a) starting a recording of a reference user track in the user data region;
 (b) starting a recording of index data corresponding to said user data to be recorded, from said reference index track in the index data region;
 (c) moving the recording of user data in the user data region from a track, the recording of which has been completed, onto a track adjacent to said completed track on the second direction side; and
 (d) moving the recording of index data in the index data region from a track, the recording of which has been completed, onto a track adjacent to said completed track on the first direction side.

2. A method according to the claim 1, further comprising:
recording a data item which is always to be reproduced when a reproduction operation is carried out, in the user data region on the first direction side in the user data region; and
recording a user data item, which is to be reproduced less frequently than said data item which is always to be reproduced, on the second direction side in the user data region.

3. A method according to claim 2, further comprising:
recording an index item which is always reproduced when a reproduction operation is carried out, in the index data region on the second direction side in the index data region; and
recording an index data item, which is to be reproduced less frequently than said index data item which is always to be reproduced on the first direction side in the index data region.

4. A method according to claim 1, further comprising:
a step of defining a reference address region having at least one reference address track; and
a forming step of forming a plurality of user data regions and a plurality of index data regions by repeating steps (1), (2) and (3), said forming step including a substep of:
recording addresses of reference user tracks on the reference address track when each of the reference user tracks is assigned.

5. A method according to claim 1, wherein the recordings on said plurality of tracks in said user data region are carried out at the same time.

6. A method according to claim 1, further comprising reproducing data recorded on said write-once read-many data recording medium.

7. A method of recording data by irradiating a light spot on a write-once read-many type recording medium, said recording medium comprising a recording area including a user data region and an index data region arranged adjacent to each other, said user data region having at least one track for recording user data including at least one user data item used by a user of said recording medium, said index data region having at least one track for recording index data including at least one index data item used for search of desired user data in the user data region, said at least one track in the index data region being arranged substantially in parallel with the at least one track in the user data region, said index data region being arranged adjacent to said user data region on a first direction side of said user data region, and said user data region being on a second direction side of said index data region which is opposite to said first direction side, wherein during recording data on the recording area by irradiating the light spot, said light spot is moved from a track to another track in the user data region to the second direction side, which is opposite to the first direction side, and wherein during recording data in the index region, said light spot is moved from a track to another track in the index region to the first direction side.

8. A method according to the claim 7, further comprising:
recording a data item which is always to be reproduced when a reproduction operation is carried out, in the user data region on the first direction side in the user data region; and
recording a user data item, which is to be reproduced less frequently than said data item which is always to be reproduced, on the second direction side in the user data region.

9. A method according to claim 8, further comprising:
recording an index item which is always reproduced when a reproduction operation is carried out, in the index data region on the second direction side in the index data region; and
recording an index data item, which is to be reproduced less frequently than said index data item which is always to be reproduced on the first direction side in the index data region.

10. A method according to claim 7, further comprising:
a step of defining a reference address region having at least one reference address track; and
a forming step of forming a plurality of user data regions and a plurality of index data regions, said forming step including a substep of:
recording an address of a reference user track on the reference address track when reference user tracks are defined.

11. A method according to claim 7, wherein the recordings on said plurality of tracks in said user data region are carried out at the same time.

12. A method according to claim 7, further comprising reproducing data recorded on said write-once read-many type recording medium.

13. A method of recording data on a write-once read-many recording medium by irradiating a light spot thereon on the basis of a signal corresponding to the data, said recording medium comprising a user data region and an index data region, said user data region including at least one user track for storing user data regarding a user of said recording medium, said at least one user track extending in a given direction, and said index data region being provided adjacent to said user data region, and said index data region including at least one index track for storing an index for use in searching desired user data from said at least one user track recorded on said user data region, said at least one index track extending in the same direction as said at least one user track of said user data region, said method comprising:

a user track recording step in which the user data is recorded on said user data region from a track closest to said index data region, and then after recording of the user data on the closest user track, additional user data is recorded on at least one additional user track such that said at least one additional user track is arranged successively in a direction perpendicular to the extending direction of said at least one index track of said index data region and away from said index data region and in parallel with said at least one user track of said user data region; and an index track recording step in which the index data is recorded on said index data region from a track closest to said user data region, and then after recording of the index data on the closest index track, additional index data is recorded on at least one additional index track such that said at least one additional index track is arranged successively in a direction perpendicular to the extending direction of said at least one user track of said user data region and away from said user data region, and which at least one additional index track is arranged in parallel with said at least one index track of said index data region.

14. A method according to claim 13, wherein in said user track recording step, said additional user data is recorded on a plurality of additional user tracks sequent to said closest user track.

15. A method according to claim 13, wherein:
when a predetermined number of index tracks in said index data region have been used to record index data, or a predetermined number of user tracks in said user data region have been used to record user data, an additional index data region is formed adjacent to one additional user data track in said user data region which is furthest from said first-mentioned index data region, and an additional user data region is formed adjacent to said additional index data region on the side thereof which is opposite to said first-mentioned user data region;

said additional user data region has at least one additional user track, which is closest to said additional index data region, for storing additional user data regarding the user of said recording medium, said at least one additional user track extending in the same direction as each of said at least one user track of said first-mentioned user data region and said at least one index track of said first-mentioned index data region;

said additional index data region has at least one additional index track, which is closest to said additional user data region, for storing an index for use in searching desired data from the additional user data stored in said at least one additional user track, said at least one additional index track extending in the same direction as said at least one additional user track of said additional user region;

and further comprising:
recording in said additional user data region, additional user data at first on said at least one additional user track, and then recording further additional user data by forming at least one further additional user track such that said at least one further additional user track is arranged successively in a direction perpendicular to said at least one additional index track of said additional index data region and on a side of the additional index data region opposite to said user data region and in parallel with said at least one additional user track;

recording in said additional index data region, additional index data at first on said at least one additional index track, and then recording further additional index data by forming at least one further additional index track such that said at least one further additional index track is arranged successively in a direction perpendicular to said at least one additional user track of said additional user data region and on a side of said at least one additional index track opposite to said additional user data region and in parallel with said at least one additional index track; and forming a reference address region adjacent to said index data region on the opposite side thereof relative to said user data region, and wherein said reference address region has at least one address track which stores position data of each of one index track of said index data region which is closest to index data region which is closest to said user data region and one index track of said additional index data region which is closest to said additional user data region, and said at least one address track extends in the same direction as said at least one index track of said index data region.

16. A method according to claim 15, wherein in the user track recording step, said additional user data is successively recorded on a plurality of additional user tracks sequent to said at least one additional user track, and said additional index data is successively recorded on a plurality of additional index tracks sequent to said at least one additional index track.

17. A method according to claim 15, wherein only one index track is used for recording index data in each of said index data region and said additional index data region.

* * * * *

UNITED STATES PATENT AND TRADEMARK OFFICE
CERTIFICATE OF CORRECTION

PATENT NO. : 5,436,879
DATED : July 25, 1995
INVENTOR(S) : YAMADA

It is certified that error appears in the above-indentified patent and that said Letters Patent is hereby corrected as shown below:

Title page, Item [57] ABSTRACT:

line 5, after "data" (first occurrence),
        delete: "is recorded"

line 5, after "index data" (first occurrence),
        insert: --is recorded--

Signed and Sealed this

Ninth Day of April, 1996

Attest:

BRUCE LEHMAN

Attesting Officer        Commissioner of Patents and Trademarks